Sept. 22, 1931. J. R. HUGHES 1,824,719
BODY CONSTRUCTION
Filed June 28, 1928    2 Sheets-Sheet 1

INVENTOR
James R. Hughes
BY
P. W. Pomeroy
ATTORNEY

Sept. 22, 1931. J. R. HUGHES 1,824,719
BODY CONSTRUCTION
Filed June 28, 1928 2 Sheets-Sheet 2

INVENTOR
James R. Hughes
BY
ATTORNEY

Patented Sept. 22, 1931

1,824,719

UNITED STATES PATENT OFFICE

JAMES R. HUGHES, OF SOUTH BEND, INDIANA, ASSIGNOR TO THE STUDEBAKER CORPORATION, OF SOUTH BEND, INDIANA, A CORPORATION OF NEW JERSEY

BODY CONSTRUCTION

Application filed June 28, 1928. Serial No. 288,826.

This invention relates to vehicle bodies and particularly to the peak rails and sun visors therefor, the principal object being to provide a vehicle body with a sun visor which forms a portion of the body proper.

Another object is to provide a vehicle body with a sheet metal sun visor which forms a portion of the body peak rail.

Another object is to provide a closed vehicle body with a peak rail of hollow cross section, a portion of which extends forwardly and downwardly to provide a sun visor.

A further object is to provide a closed vehicle body with a peak rail of hollow cross section comprising two oppositely-disposed metal channel-shaped stampings secured together along their adjacent flanges, one of which provides a support for the vehicle windshield and the other of which is extended forwardly and downwardly to provide a sun visor.

These being among the objects of the present invention, the same consists of certain features of construction and combination of parts to be hereinafter described with reference to the accompanying drawings, and then claimed, having the above and other objects in view.

In the accompanying drawings which illustrate a suitable embodiment of the present invention, Figure 1 is a perspective view of the vehicle body showing the sun visor incorporated thereon.

Figure 1:
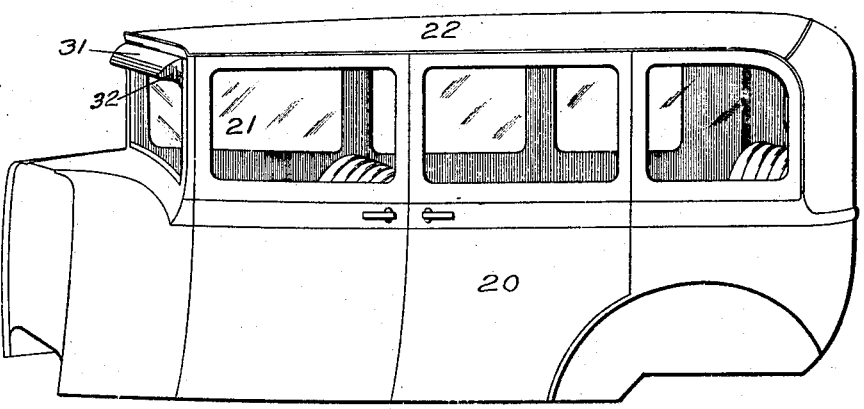

Referring to the accompanying drawings in which like numerals refer to like parts throughout the several views, the vehicle body 20 is of the conventional closed type having door pillars 21 and a top 22 supported thereon by top side rail members 23. As in all conventional constructions the space between the forward free ends of the side rails 23 is bridged by a member commonly known as a peak rail which is connected at its ends by brackets 24 to the side rails 23. Each bracket 24 is also connected to the adjacent front door pillar 21 to support the forward end of the top 22.

Figure 2:
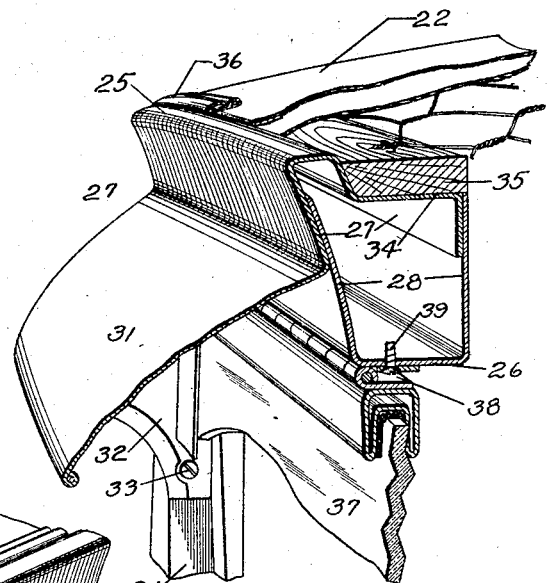
Figure 2 is an enlarged fragmentary perspective view showing the body peak rail and windshield in section taken as looking toward one of the door pillars.
Figure 3:
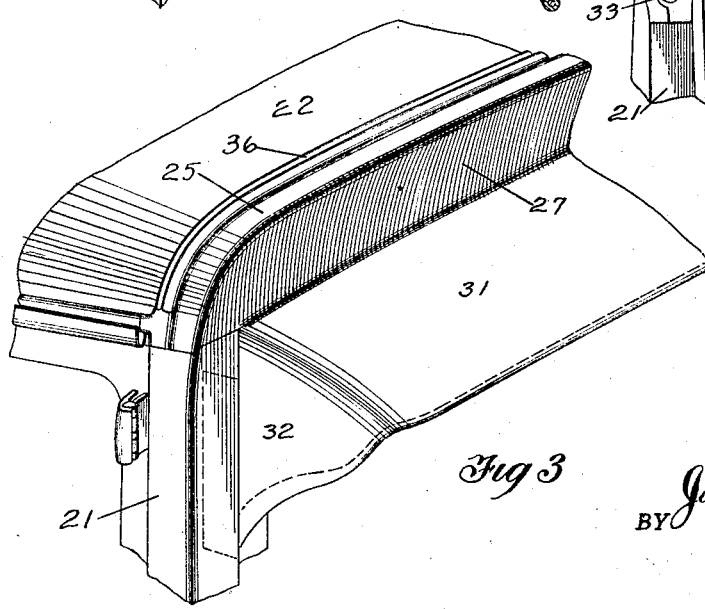
Figure 3 is an enlarged fragmentary perspective view showing the visor and peak rail in completed form assembled to a vehicle body.

The peak rail and visor construction comprising the subject matter of the present invention, as clearly shown in Figure 2, is comprised entirely of two stamped metal members 25 and 26, the lower member 26 being channel-shaped in form and facing upwardly. The upper member 25 is formed with a generally channel-shaped portion which faces downwardly and the legs or flanges 27 thereof preferably telescope with and are welded or otherwise suitably secured to the legs or flanges 28 of the lower member 26. The members 25 and 26 are secured together in the manner just described to provide a hollow, rigid, boxlike structure which extends across the front of the body top 22.

Figure 4:
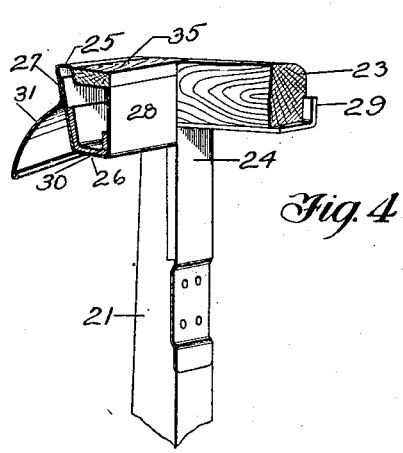
Figure 4 is an enlarged fragmentary perspective view showing the method of attaching one end of the peak rail and adjacent top side rail to one of the body pillars.
Figure 5:
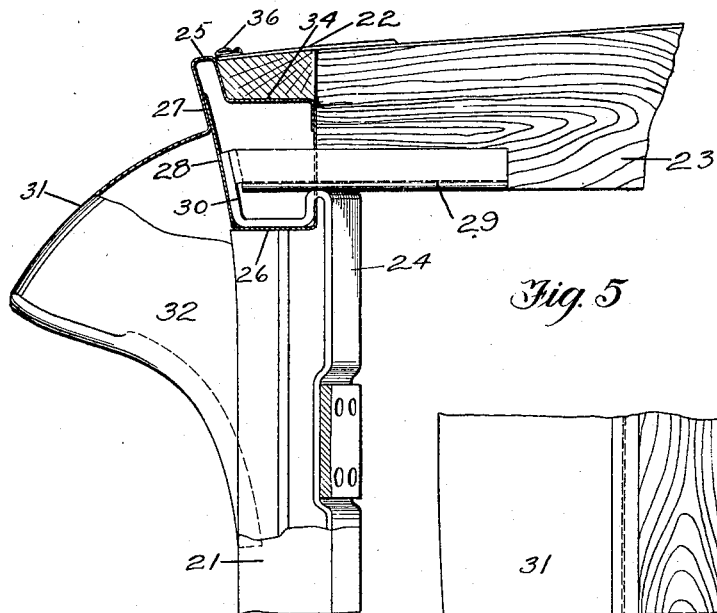
Figure 5 is an enlarged fragmentary elevational view of one of the upper front corners of the body having portions broken away to clearly show how the door pillar bracket is secured to the peak rail and top side rail.
Figure 6:
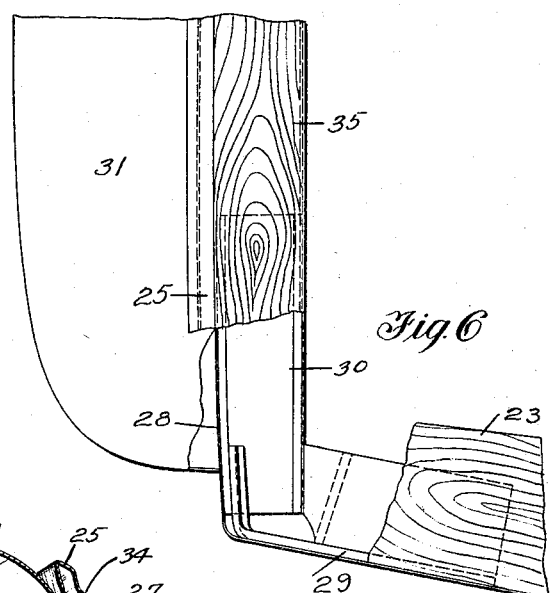
Figure 6 is an enlarged partial plan view of one of the upper front corners of the body having portions broken away to show the door pillar bracket.
Figure 7:
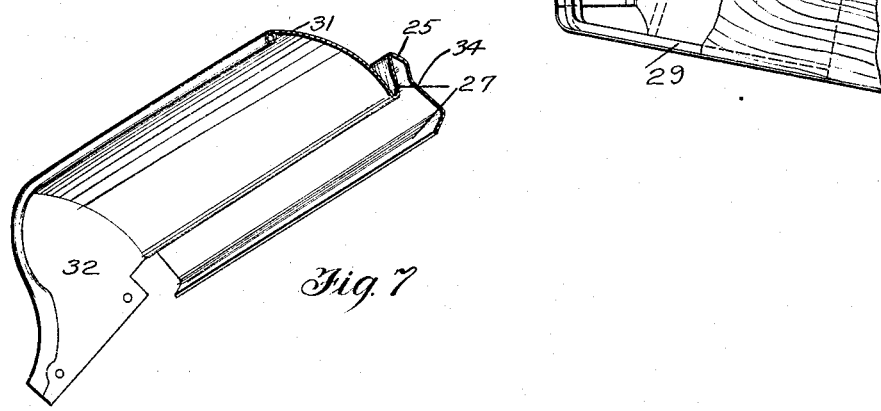
Figure 7 is a partial perspective view of the sun visor looking toward the under side of the same.

The door pillar bracket 24 which is secured to a front door pillar 21 preferably has a rearwardly extending angle-shaped arm 29 which is secured to the top side rail 23, and also has a transversely extending channel-shaped arm 30. This channel-shaped arm 30, as shown in Figures 4, 5 and 6, extends within the hollow structure formed by the members 25 and 26 and is seated against the sides and bottom of the lower member 26 where it is securely welded or otherwise suitably secured thereto.

The forward flange 27 of the upper member 25 is extended and bent forwardly and then downwardly, terminating substantially below the horizontal plane of the lower member 26 to form a sun visor 31. The ends 32 of the sun visor portion 31 are preferably bent vertically downwardly where they are secured by suitable screws to the inner faces of the front door pillars 21. The base of the upper member 25 is depressed along one edge to form a longitudinal seat 34 for a wooden tacking strip 35 which is suitably secured thereto. The various coverings for the top 22 are tacked to the strip 35 and a moulding 36 is also suitably secured thereto to cover the tacking means and to cover the edges of the top covering substantially as shown in Figures 2 and 5.

The lower peak rail member 26 in addition to forming a portion of the peak rail supports the vehicle windshield 37, and the hinge 38 therefor is secured to the lower horizontal face of the member 26 with suitable screws 39.

It is evident from the views shown in the drawings and from the foregoing description that an improved peak rail visor for vehicle bodies of the closed type is provided which is extremely economical to manufacture and assemble. This construction is made from two single sheet metal stampings secured together and then assembled to the door pillar brackets 24. This assembly is the only one which has to be performed, with the exception of attaching the ends 32 of the visor portion 31 to the pillars 21, thereby eliminating the necessity of securing the separate visor to the peak rail with a plurality of bolts or screws. This method saves considerable expense and time in assembly. The peak rail of the present invention is extremely rigid because of the hollow, boxlike structure of the same which may be compared to a girder construction.

It is to be understood, that certain changes may be made in the specific embodiment of the invention described without departing from the spirit and substance of the broad invention, the scope of which is commensurate with the appended claims.

What I claim is:

1. In a vehicle body having top side rails, a peak rail interconnecting said rails comprising two sheet metal members overlapping each other and secured together to form a hollow, boxlike structure, one of said members extending at substantially right angles to the overlapping portion thereof to provide a sun visor.

2. In a vehicle body having top side rails, a peak rail interconnecting said rails comprising two channel-shaped sheet metal members overlapping each other and secured together along their adjacent flanges to form a hollow, boxlike structure, one of said members extending at substantially right angles to the overlapping portion thereof to provide a sun visor.

3. In a vehicle body having top side rails, brackets secured to the forward ends of said rails having transversely extending arms, and a peak rail comprising channel-shaped members secured together along their adjacent flanges to form a hollow structure having said transversely extending arms received therein.

4. In a vehicle body having top side rails, a peak rail comprising a pair of channel-shaped sheet metal members secured together along their adjacent overlapping flanges to form a hollow structure, and brackets secured to the forward ends of said side rails having transversely extending arms extending into the ends of said structure and secured to one of said channel-shaped members.

5. In a vehicle body having top side rails and front door pillars, brackets securing said side rails to said pillars, a peak rail comprising channel-shaped members secured together along their adjacent overlapping flanges to form a hollow structure, and transversely extending arms secured to said brackets extending within the ends of said hollow structure and secured to the inner sides and bottom of one of said channel-shaped members.

6. In a vehicle body having top side rails and a windshield, a peak rail interconnecting said side rails comprising a pair of sheet metal members secured together along their adjacent overlapping edges, one of said members being extended downwardly over the other member and then forwardly to form a sun visor, and the other of said members being provided with means for supporting said windshield.

Signed by me at South Bend, Indiana this 26th day of June 1928.

JAMES R. HUGHES.